(12) United States Patent
Martinez

(10) Patent No.: US 9,220,187 B2
(45) Date of Patent: Dec. 29, 2015

(54) HYDRAULIC PLOUGH ACTUATED BY TRACTOR VEHICLE THRUST

(71) Applicant: Julio Santamaria Martinez, Burgos (ES)

(72) Inventor: Julio Santamaria Martinez, Burgos (ES)

( * ) Notice: Subject to any disclaimer, the term of this patent is extended or adjusted under 35 U.S.C. 154(b) by 0 days.

(21) Appl. No.: 13/969,740

(22) Filed: Aug. 19, 2013

(65) Prior Publication Data

US 2015/0047541 A1 Feb. 19, 2015

(51) Int. Cl.
| | |
|---|---|
| A01B 49/06 | (2006.01) |
| A01B 3/46 | (2006.01) |
| A01B 63/22 | (2006.01) |
| A01B 63/32 | (2006.01) |
| A01C 23/02 | (2006.01) |

(52) U.S. Cl.
CPC . *A01B 49/06* (2013.01); *A01B 3/46* (2013.01); *A01B 63/22* (2013.01); *A01B 63/32* (2013.01); *A01C 23/023* (2013.01)

(58) Field of Classification Search
CPC ........ A01B 49/06; A01B 49/04; A01B 49/00; A01B 3/46; A01B 3/00; A01B 63/22; A01B 63/16; A01B 63/14; A01B 63/00; A01B 63/32; A01B 63/24; A01C 23/023; A01C 23/02; A01C 23/00
See application file for complete search history.

(56) References Cited

U.S. PATENT DOCUMENTS 3,433,307 A * 3/1969 Gilbert ............................ 172/4

FOREIGN PATENT DOCUMENTS

| EE | 2027025 | * | 5/1992 |
| EE | 1048062 | * | 11/2001 |
| EE | 1056860 | * | 5/2004 |

* cited by examiner

*Primary Examiner* — Christopher J Novosad
(74) *Attorney, Agent, or Firm* — John Alumit

(57) ABSTRACT

The invention relates to a plough which is used by actuating a thrust movement from a tractor vehicle with one arm lowered and with the other one raised, then it is turned and returns to the same furrow with the arms in the opposite position. The said plough is constituted by a metal chassis, wheel sets, a vertical tripod or turret, a receptacle for electrically operated valves, turning structure, fluid transmission lines, hydraulic cylinders and dispensers.

4 Claims, 2 Drawing Sheets

HYDRAULIC PLOUGH ACTUATED BY TRACTOR VEHICLE THRUST

Figure 1:
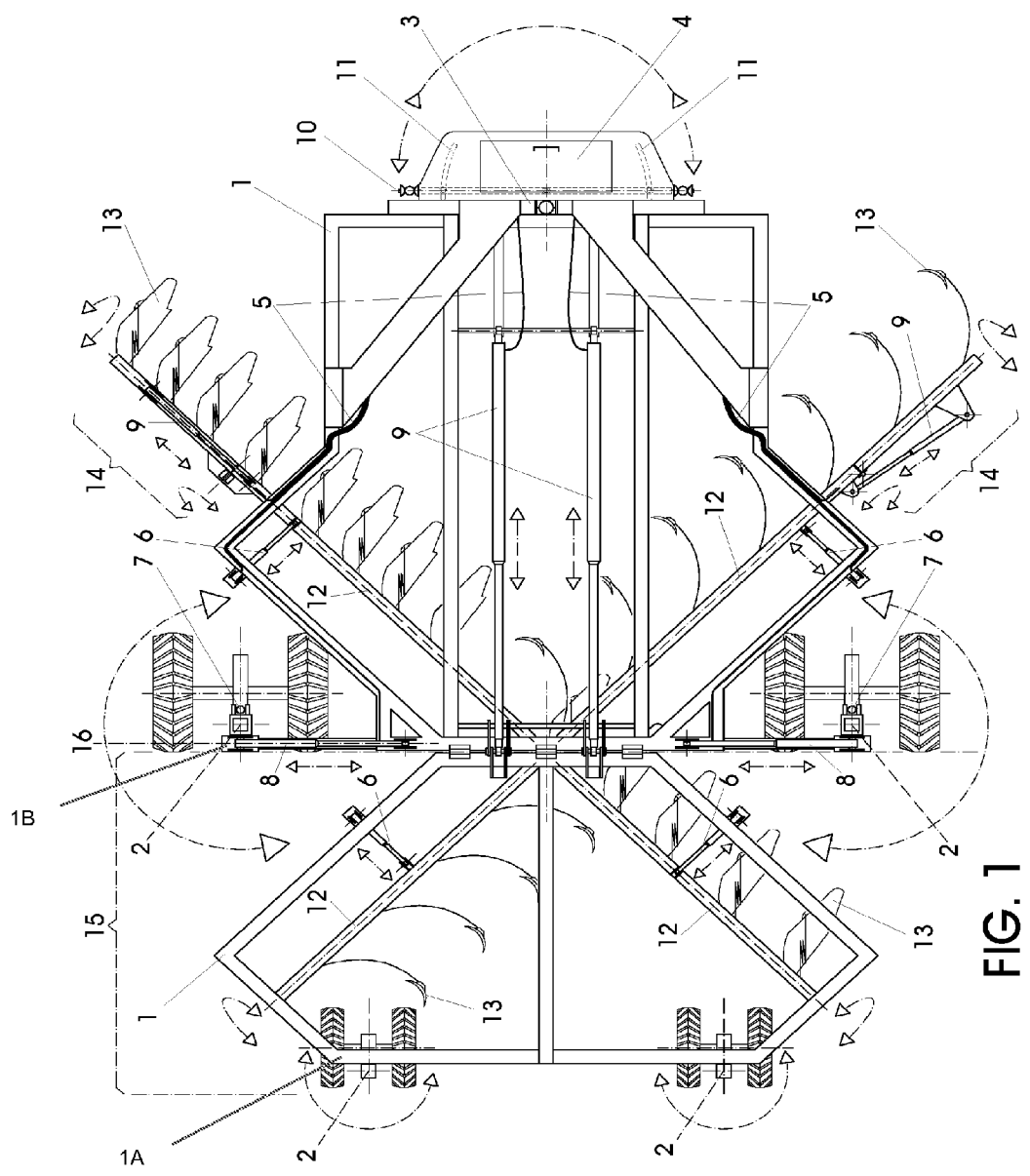

The present invention relates to a machine of the hydraulic type for ploughing the land, which is not pulled by a tractor vehicle but is thrust by it. The system which will be described hereinafter saves the user approximately 60% of diesel, time, money, etc.

The machine in question provides essential characteristics of novelty and notable advantages in comparison with the means known and used for the same purposes in the prior art.

Ploughs are tools which are widely known because of their great usefulness in agriculture, since they are responsible for preparing and turning over the soil before the seeds are sown. Although their use dates back several centuries, and they have developed with significant changes in the course of time, nevertheless ploughs at present have a series of disadvantages which cause users economic, physical and time losses. With the conventional plough, which ploughs a length of approximately 40 cm and a depth of approximately 25 cm, the land is cut or filleted, and when the harrow or tiller passes, large and small ridges are formed, thus causing significant movement or jumps for the tractor vehicle, thus making the work of the driver difficult and unpleasant. In addition, quite a lot of time and diesel is used in order to leave the land in an averagely good condition. Sometimes a considerable amount of dust is raised when the harrow or tiller passes, and if the land is not correctly prepared not all the seeds will grow, and approximately between 15 and 20% of them will be wasted. Another disadvantage to be taken into account is that when ploughing with the tractor, the driver needs to look backwards continually, which on many occasions gives rise to ailments and discomfort. Furthermore, when the fertilizer drill is used, the fertilizer is not at all well spread, which has a negative effect on the final product, meaning that more liters of rain per square meter are needed in order to plough with the conventional system. In conclusion, with the conventional ploughing system, the land is not well worked or loosened, seed is wasted, the land is not well fertilized, more machinery or implements are needed, and the land needs to be passed over several times, firstly in order to plough, then to fertilize, pass the harrow or tiller, sow and pass over with the harrow, and roll, resulting in the use of considerable time, wear of the machinery, many hours spent on the tractor, tiredness on the part of the operator, and presumably the use of a large amount of diesel, with the economic loss and ecological damage which this involves.

The invention proposed intends to provide a solution which is ecological and easy to use, the effect of which would be ploughing work which is faster, more efficient and more economical, thus reducing the costs, and the amount of time taken, as well as the tiredness of the operators.

The patent which forms the subject of this invention has its field of application in the sector of agricultural machinery, and more specifically in that of hydraulic ploughs.

In the prior art there are documents relating to the invention in question, but none of them provides the same advantageous characteristics, or resolves the existing disadvantages efficiently.

Thus, in document ES 1 048 062, there is a ploughing machine of the type used to plough fields of crops, for example in plantations of trees, stocks, etc., formed by a central chassis joined to another two parallelogram satellite chassis, the latter each being joined to the central chassis by arms or articulations which can be lowered, disposed in the front and rear areas, characterized substantially in that it has hydraulic pistons which join the central area of each satellite chassis with the intermediate area of the rear articulations for joining to the central chassis. This document has a fixed tiller or plough, whereas the invention proposed provides a reversible plough. In addition, this document does not involve a plough which is suitable for being thrust by a tractor vehicle, but is suitable for being pulled, meaning that the aforementioned disadvantages are not resolved.

In addition, in document ES 2 027 025 a semi-suspended multiple plough is provided, comprising a large number of tilling bodies secured to a bar, the bar being constituted by at least two elements which are joined in pairs by an articulation around a horizontal shaft in the position of work of the plough, characterized in that the plough is reversible, and comprises the said articulation(s), in addition to means for blocking at least during the manoeuvres, and especially during the overturning of the ploughshares. Although this document provides assistance for alignment of the plough, it does not include characteristics appropriate for using a plough and a seed drill in the same passage.

In turn, document ES 1 056 860 claims an extendable chassis for agricultural tilling formed by longitudinal frames each having telescopic transverse frames on the said central frame which are actuated by hydraulic means, characterized in that: the central frame has a beam which is articulated on a rotational shaft, and has two ends each joined to connecting rods articulated on the lateral frames, which ends have a telescopic joint. It has a single hydraulic cylinder for positioning and transverse actuation, which acts on an eccentric part of the said beam, such that the extension or compression of the hydraulic cylinder modifies in both parts simultaneously and to the same extent the distance between the lateral frames and the centre of the chassis. Unlike the invention proposed, this document does not include characteristics appropriate for using a plough and a seed drill at the same time either, thus preventing a potential saving of approximately 60% of diesel, time and money.

It can thus be seen that hitherto a plough has not been known which, because of its innovative characteristics, resolves the above-described disadvantages, with reference both to the documents cited and to other inventions or conventional ploughs which exist according to the prior art.

Taking into consideration the cases described and having analysed the associated arguments, the invention proposed in the present document gives rise to a final result in which there are provided aspects which differ significantly in comparison with the prior art, and in which there are provided a series of advances in the elements already known, together with the corresponding advantages thereof.

In particular:

With the plough being thrust by the tractor vehicle, the latter is connected in its rear part to a seed drill, and various agricultural actions can be carried out at the same time, thus, according to studies carried out, saving approximately 60% of the time, diesel and money. For example, if, at the same time as thrusting this plough, the tractor pulls a double-hopper seed drill, one for the seed and the other for the fertilizer, with a rotary unit or tiller, with a harrow and with a roller, all with a 2,500 mm plough, at an average speed of 8 km/h it will have carried out ploughing of 20,000 $m^2$ an hour. In 30 minutes a hectare will have been ploughed, the tiller or rotary unit will have been passed over, sowing will have taken place, the fertilizer will have been put in the same place as the seed, the harrow will have passed over, and the rolling will have been carried out. In other words, 6 ploughing operations will have been carried out in a single passage.

The tractor vehicle has a lower expenditure, it consumes less diesel, harmful emissions are reduced, and it is therefore more environmentally friendly.

Since he has the plough in front of him, the operator does not need to keep turning his head continually in order to check the ploughing which the plough is carrying out, thus preventing cervical pains and discomfort.

Since this is a plough with at least 26 dispensers, 13 of them will go on the left and 13 on the right alternately, and this will make it possible to go to and fro along the same furrow, with ploughing at each passage of 2,620 mm, 201.54 mm for each dispenser and a depth of 150 to 200 mm, thus leaving the land loose and not cut, and therefore obtaining the best terrain for the crop.

It is a flat reversible suspended plough in cross form and which can be lifted up, thus allowing it to travel on roads or tracks.

Thus, the present invention is constituted by the following elements:

A horizontal metal chassis in the form of a cross, supported on at least four wheel sets, wherein each wheel set has two twin wheels which rotate around 360° and are adapted to the terrain by their beam, uniformly distributed for the stability of the assembly by means of two transverse shafts, one of them in the front area and the other in the relatively central area, with a vertical tripod or turret in order to hitch up to the front linkage of the tractor, and, in its base, a receptacle for electrically operated valves and controlled turning means for the said tractor vehicle, with fluid transmission lines which are connected at one end to the vehicle, and at the other end to the receptacle for electrically operated valves, and then in turn to the twelve hydraulic cylinders, i.e. four cylinders for the control of the dispensers, two cylinders to control the depth of ploughing and raising of the plough, two cylinders for the gauge widening of the central wheels and four cylinders which raise the plough for travel on a road. The turning means consists of a horizontal transverse bar which is secured inside the base of the tripod or turret, this base having on its lower surface oblique guide tracks with a variable thickness which, during the thrust, impart a movement of correction of turning to the right or left of the plough, and in turn, blocking of the movement of the plough when the tractor vehicle draws the bar backwards, the said turning of the bar being able to be blocked by means of a central bolt for transport on a road. The tripod with its joining means is in the rear area of the plough, and is joined to the linkage of the tractor vehicle for the thrust of the movement. In its lower area, the chassis supports two horizontal metal arms in the form of an "X", which in turn each support integrally at least 13 dispensers, the said arms being able to raise or lower their dispensers by means of the actuation of hydraulic cylinders. The height of the entire structure can be adjusted by the actuation of vertical hydraulic cylinders located at each end of the shafts. At least two of the ends of the arms can be lowered, thus maintaining an appropriate width for travel of the plough on the land or on the road. The front area of the plough can also be lowered, by being articulated by the relatively central shaft of the structure, and by means of each of (a pair of) parallel hydraulic cylinders which are secured at one end to the front area and at the other end to the rear area of the chassis. In turn, the relatively central shaft has at its ends horizontal hydraulic cylinders which regulate the length of the said shaft.

The plough is used by actuating a thrust movement from the tractor vehicle with one arm lowered and with the other one raised, then it is turned and returns to the same furrow with the arms in the opposite position.

Figure 2:
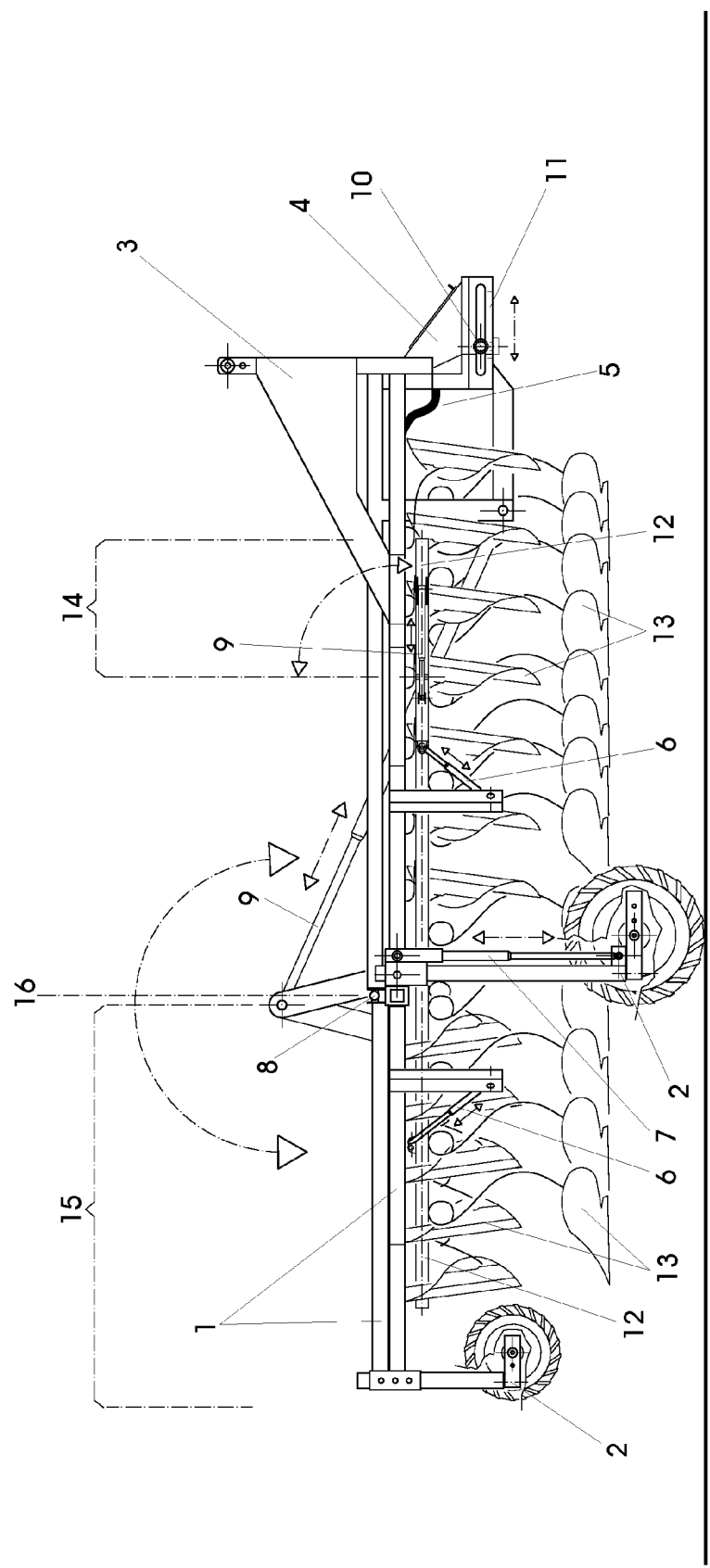

For better understanding of this description, it is accompanied by a drawing which, by way of non-limiting example, describes a preferred embodiment of the invention:

FIG. 1.—Plan view
FIG. 2.—Lateral elevation

These figures contain the following numbered elements:
1. Metal chassis
2. Wheel sets
3. Tripod or turret
4. Receptacle for electrically operated valves
5. Lines
6. Cylinders for the control of dispensers
7. Cylinders for the control of the depth of ploughing
8. Cylinders for the gauge widening of the central wheels
9. Cylinders which raise the plough for travel on a road
10. Steering bar
11. Guide tracks
12. Horizontal metal arms
13. Dispensers
14. Ends of arms which can be lowered
15. Middle front area which can be lowered
16. Central shaft A preferred embodiment of the invention proposed consists of the following elements: a horizontal metal chassis (1) in the form of a diamond shape front section and a rectangular shape rear section, at least one elongated bar intersecting the diamond shape front section and at least one elongated bar intersecting the rectangular shape back section, supported on at least four wheel sets (2), wherein each wheel set has twin wheels which rotate around 360° and are adapted to the terrain, uniformly distributed for the stability of the assembly by means of two transverse shafts (1A, 1B), one of them in the front area (15), known as the front transverse shaft (1A) and the other in the central area, known as the central transverse shaft (1B) with a vertical tripod or turret (3) adapted to hitch up to the front linkage of a tractor, and, in its base, a receptacle for electrically operated valves (4) and controlled turning means for said tractor vehicle, with fluid transmission lines (5) which are connected at one end to the vehicle, and at the other end to the receptacle for electrically operated valves, and then in turn to the twelve hydraulic cylinders, i.e. four cylinders (6) for the control of the dispensers, two cylinders (7) to control the depth of ploughing and raising of the plough, two cylinders (8) for widening of the central wheels and four cylinders (9) which raise the plough for travel on a road. The turning means consists of a horizontal transverse bar (10) which is secured inside the base of the tripod or turret (3), this base having on its lower surface oblique guide tracks (11) with a variable thickness which, during the thrust, impart a movement of correction of turning to the right or left of the plough, and in turn, blocking of the movement of the plough when the tractor vehicle draws the bar backwards, said turning of the bar (10) being able to be blocked by means of a central bolt for transport on a road. The tripod with its joining means is in the rear area of the plough, and is joined to the linkage of the tractor vehicle for the thrust of the movement. In its lower area, the chassis supports two horizontal metal arms (12) in the form of an "X", which in turn each support integrally at least thirteen dispensers (13), said arms being able to raise or lower their dispensers by means of the actuation of hydraulic cylinders. The height of the entire structure can be adjusted by the actuation of vertical hydraulic cylinders located at each end of the two transverse shafts. At least two of the ends of the arms (14) can be lowered, thus maintaining an appropriate width for travel of the plough on the land or on the road. The front area (15) of the plough can also be lowered, by being articulated by the central transverse shaft, and by means of parallel hydraulic cylinders which are secured at one end to the front area and at the other end to the rear area of the chassis. In turn, the central shaft (16) has at its ends horizontal hydraulic cylinders which regulate the length of said shaft.

The invention claimed is:

1. A hydraulic plough actuated by tractor vehicle thrust, comprising:
- a horizontal metal chassis (1) in the form of a a diamond shape front section and a rectangular shape rear section, at least one elongated bar intersecting the diamond shape front section and at least one elongated bar intersecting the rectangular shape back section,
- said horizontal metal chassis is supported on at least four wheel sets (2), at least two wheel sets disposed on a front transverse shaft, and at least two wheel sets disposed on a central transverse shaft, wherein each wheel set has twin wheels which rotate around 360° and are adapted to the terrain,
- a turret (3) at a rear end of the horizontal metal chassis, said turret adapted to hitch up to a front linkage of a tractor,
- turning means in the form of a horizontal transverse bar secured inside a base of the turret (3), said base having on its lower surface oblique guide tracks (11) with variable thickness which, during thrust, impart a movement of correction of turning the hydraulic plough to the right or the left, and in turn, blocking movement of the hydraulic plough when the tractor draws the bar backwards;
- a receptacle for electrically operated valves (4) for said tractor at a base of the turret, and
- fluid transmission lines (5) which are connected at one end to the tractor, and at the other end to the receptacle for electrically operated valves, and further connected to hydraulic cylinders,
- said hydraulic cylinders comprise two cylinders (7) to control depth of ploughing and raising of the plough, two cylinders (8) for widening of the at least two wheel sets disposed on a central transverse shaft, and four cylinders (9) which raise the plough for travel on a road; and
- two horizontal metal arms in the form of an "X", each arm integrally supporting at least thirteen dispensers (13), said arms being able to raise or lower their dispensers by means of the actuation of hydraulic cylinders.

2. The hydraulic plough actuated by tractor vehicle thrust according to claim 1, wherein the height of the plough can be adjusted by actuation of vertical hydraulic cylinders located at each end of the two transverse shafts, and in that at least two of the ends of the horizontal metal arms (14) can be lowered, thus maintaining an appropriate width for travel of the hydraulic plough on the land or on the road.

3. The hydraulic plough actuated by tractor vehicle thrust according to claim 1, wherein the front area (15) of the plough can also be lowered, by being articulated by the central transverse shaft (16), and by means of parallel hydraulic cylinders which are secured at one end to the front section and at the other end to the rear section of the chassis.

4. The hydraulic plough actuated by tractor vehicle thrust according to claim 1, wherein said central transverse shaft has at its ends horizontal hydraulic cylinders which regulate the length of said central transverse shaft.

* * * * *